United States Patent
Takahashi et al.

(10) Patent No.: US 12,133,220 B2
(45) Date of Patent: Oct. 29, 2024

(54) TERMINAL, RADIO COMMUNICATION METHOD, BASE STATION, AND SYSTEM FOR DOWNLINK SHARED CHANNEL ALLOCATION

(71) Applicant: NTT DOCOMO, INC., Tokyo (JP)

(72) Inventors: Yuki Takahashi, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 343 days.

(21) Appl. No.: 17/620,539

(22) PCT Filed: Jun. 18, 2019

(86) PCT No.: PCT/JP2019/024158
§ 371 (c)(1),
(2) Date: Dec. 17, 2021

(87) PCT Pub. No.: WO2020/255270
PCT Pub. Date: Dec. 24, 2020

(65) Prior Publication Data
US 2022/0248437 A1    Aug. 4, 2022

(51) Int. Cl.
*H04W 72/1273* (2023.01)
*H04L 1/00* (2006.01)
*H04W 72/0446* (2023.01)
*H04W 72/23* (2023.01)

(52) U.S. Cl.
CPC ....... *H04W 72/1273* (2013.01); *H04L 1/0061* (2013.01); *H04W 72/0446* (2013.01); *H04W 72/23* (2023.01)

(58) Field of Classification Search
CPC ......... H04W 72/1273; H04W 72/0446; H04W 72/23; H04L 1/0061
See application file for complete search history.

(56) References Cited

U.S. PATENT DOCUMENTS

| | | | |
|---|---|---|---|
| 2019/0082448 A1* | 3/2019 | Nogami | H04L 5/0053 |
| 2019/0082457 A1* | 3/2019 | Zhou | H04L 5/0094 |
| 2019/0149365 A1* | 5/2019 | Chatterjee | H04L 25/0226 370/329 |
| 2022/0174716 A1* | 6/2022 | Takeda | H04W 74/0808 |
| 2022/0201722 A1* | 6/2022 | Takeda | H04L 1/1887 |

(Continued)

OTHER PUBLICATIONS

International Search Report issued in PCT/JP2019/024158 on Dec. 10, 2019 (1 page).

(Continued)

*Primary Examiner* — Deepa Belur
(74) *Attorney, Agent, or Firm* — Osha Bergman Watanabe & Burton LLP

(57) ABSTRACT

A terminal according to an aspect of the present disclosure includes: a receiving section that receives downlink control information including a time domain resource allocation (TDRA) field; and a control section that determines an allocation position of a shared channel scheduled by the downlink control information based on a value specified in the TDRA field, and at least one of a reference point configured at an interval shorter than a slot and a reference point configured based on an allocation position of a control resource set.

14 Claims, 18 Drawing Sheets

MSB BIT                    BITS FOR TDRA

(56) References Cited

U.S. PATENT DOCUMENTS

2022/0248435 A1\* 8/2022 Lin ................... H04W 72/1273
2022/0287068 A1\* 9/2022 Lin ...................... H04L 5/0094

OTHER PUBLICATIONS

Written Opinion of the International Searching Authority issued in PCT/JP2019/024158 on Dec. 10, 2019 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

| ROW INDEX | dmrs-TYPE A-POSITION | PDSCH MAPPING TYPE | $K_0$ | S | L |
|---|---|---|---|---|---|
| 1 | 2 | TYPE A | 0 | 2 | 12 |
| | 3 | TYPE A | 0 | 3 | 11 |
| 2 | 2 | TYPE A | 0 | 2 | 10 |
| | 3 | TYPE A | 0 | 3 | 9 |
| 3 | 2 | TYPE A | 0 | 2 | 9 |
| | 3 | TYPE A | 0 | 3 | 8 |
| 4 | 2 | TYPE A | 0 | 2 | 7 |
| | 3 | TYPE A | 0 | 3 | 6 |
| 5 | 2 | TYPE A | 0 | 2 | 5 |
| | 3 | TYPE A | 0 | 3 | 4 |
| 6 | 2 | TYPE B | 0 | 9 | 4 |
| | 3 | TYPE B | 0 | 10 | 4 |
| 7 | 2 | TYPE B | 0 | 4 | 4 |
| | 3 | TYPE B | 0 | 6 | 4 |
| 8 | 2,3 | TYPE B | 0 | 5 | 7 |
| 9 | 2,3 | TYPE B | 0 | 5 | 2 |
| 10 | 2,3 | TYPE B | 0 | 9 | 2 |
| 11 | 2,3 | TYPE A | 0 | 12 | 2 |
| 12 | 2,3 | TYPE A | 0 | 1 | 13 |
| 13 | 2,3 | TYPE A | 0 | 1 | 6 |
| 14 | 2,3 | TYPE B | 0 | 2 | 4 |
| 15 | 2,3 | TYPE B | 0 | 4 | 7 |
| 16 | 2,3 | TYPE B | 0 | 8 | 4 |

FIG. 2

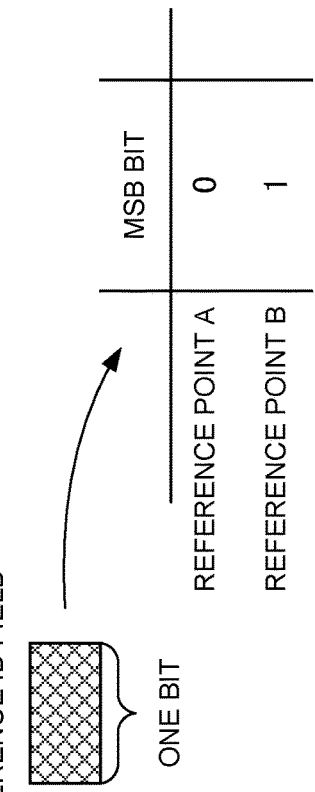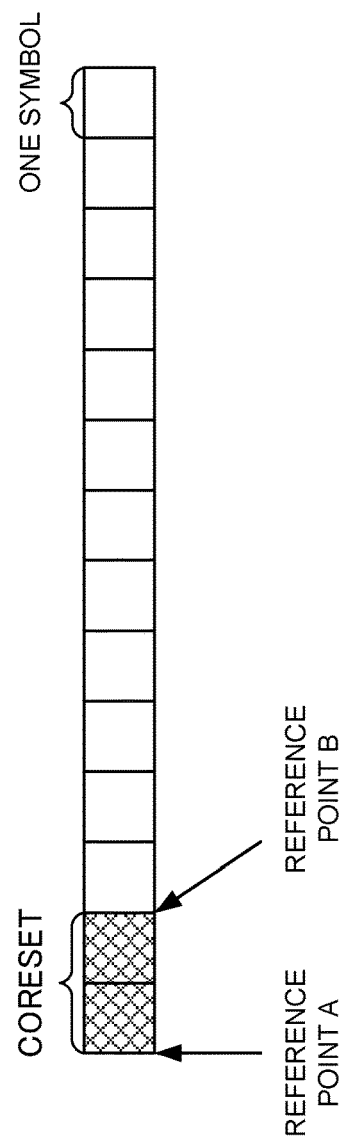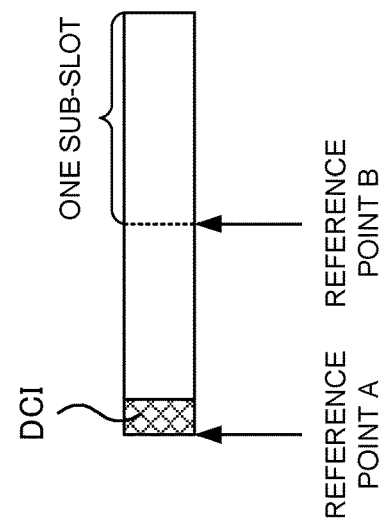
FIG. 7A
FIG. 7B
FIG. 7C

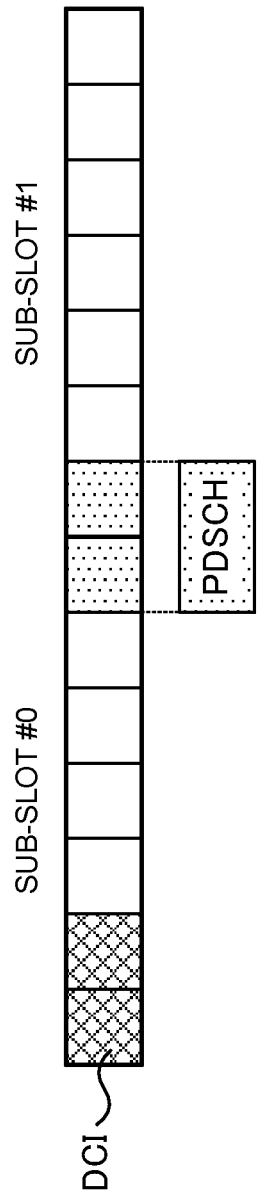
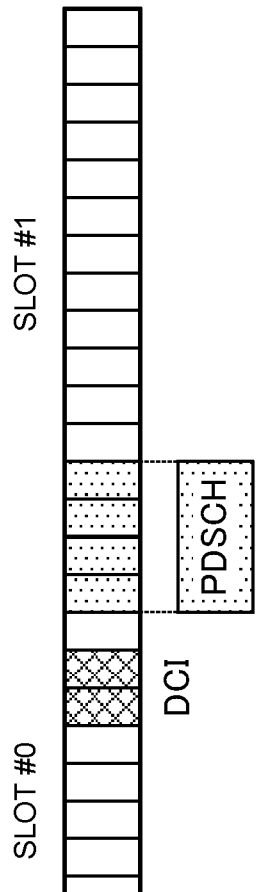
FIG. 9A
FIG. 9B

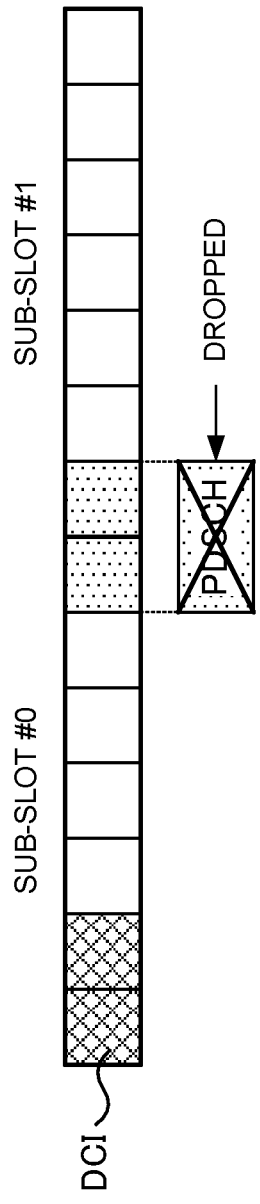 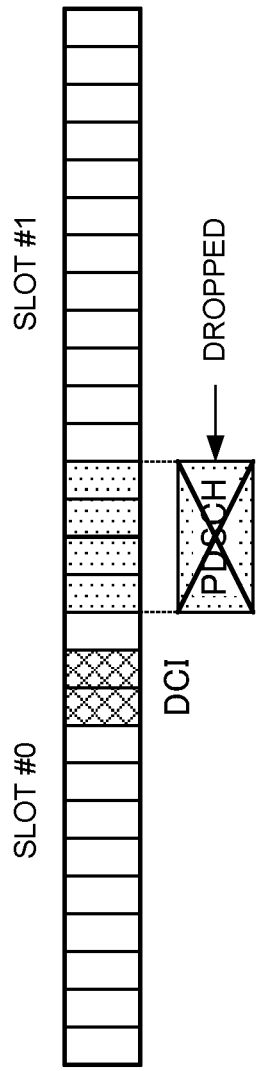
FIG. 10A
FIG. 10B

FIG. 14A

```
PDSCH-TimeDomainResourceAllocation::=SEQUENCE {
    K0 INTEGER(0..32) OPTIONAL, --Need s
    mappingType ENUMERATED {typeA, typeB},
    startSymbolAndLength INTEGER (0..127),
    referenceGranurality ENUMERATED {slot, sub-slot, CORESET}
```

FIG. 14B

```
PDSCH-TimeDomainResourceAllocation::=SEQUENCE {
    K0 INTEGER(0..32) OPTIONAL, --Need s
    mappingType ENUMERATED {typeA, typeB},
    startSymbolAndLength INTEGER (0..127),
    referenceGranurality ENUMERATED {slot, sub-slot, CORESET, dynamic}
```

TERMINAL, RADIO COMMUNICATION METHOD, BASE STATION, AND SYSTEM FOR DOWNLINK SHARED CHANNEL ALLOCATION

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (3rd generation partnership project (3GPP) Release (Rel) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In the existing LTE system (for example, 3rd Generation Partnership Project (3GPP) Rel. 8 to 14), a user terminal (user equipment (UE)) controls reception of a downlink shared channel (for example, a physical downlink shared channel (PDSCH)) based on downlink control information (DCI, also referred to as DL assignment or the like) from a base station. Also, the user terminal controls transmission of an uplink shared channel (for example, a physical uplink shared channel (PUSCH)) based on DCI (also referred to as UL grant or the like).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In a future radio communication system (hereinafter, referred to as New Radio (NR)), a study is underway for scheduling of a shared channel by downlink control information (DCI) or the like. In addition, it is assumed that the size of the DCI is reduced (DCI size reduction), the DCI having a small size (compact DCI) is introduced, or the like in order to suppress an increase in the number of pieces of DCI monitored by a terminal.

For example, it is conceivable to reduce the bit size or the number of bits of a given field (for example, a time domain resource allocation (TDRA) field or the like) included in the DCI. However, how to control the design of the DCI or the transmission and reception using the DCI in such a case has not been sufficiently studied.

Therefore, an object of the present disclosure is to provide a terminal and a radio communication method capable of appropriately performing communication even in a case where new downlink control information is introduced.

Solution to Problem

A terminal according to an aspect of the present disclosure includes: a receiving section that receives downlink control information including a time domain resource allocation (TDRA) field; and a control section that determines an allocation position of a shared channel scheduled by the downlink control information based on a value specified in the TDRA field, and at least one of a reference point configured at an interval shorter than a slot or a reference point configured based on an allocation position of a control resource set.

Advantageous Effects of Invention

According to an aspect of the present disclosure, communication can be appropriately performed even in a case where new downlink control information is introduced.

BRIEF DESCRIPTION OF DRAWINGS

FIG. 2 is a diagram illustrating an example of a table used for notification of time domain resource allocation information.

FIGS. 7A to 7C are diagrams illustrating an example of a method of performing notification of information regarding the reference point.

FIGS. 9A and 9B are diagrams illustrating an example of a configuration in which a shared channel is arranged across a sub-slot boundary or a slot boundary.

FIGS. 10A and 10B are diagrams illustrating an example of a user equipment (UE) operation in a case where the shared channel is arranged across the sub-slot boundary or the slot boundary.

FIGS. 14A and 14B are diagrams illustrating another example of the method of performing notification of the information regarding the granularity of the reference point.

DESCRIPTION OF EMBODIMENTS

<New DCI Format>

A new downlink control information (DCI) format has been discussed in Rel. 16 or later. The new DCI format may be used for a specific service (for example, ultra-reliable and low-latency communications (URLLC)).

The new DCI format may have a size that can be configured for some fields, or the number of bits of some fields can be reduced as compared with Rel. 15. The minimum DCI size of this DCI format may be obtained by reducing a DCI format size (up to 44 bits) of fallback DCI of Rel. 15 by 10 to 16 bits. The maximum DCI size of this DCI format may be larger than that of the fallback DCI of Rel. 15. The size of this DCI format may be able to be aligned with the size of the fallback DCI of Rel. 15 (or for the eMBB). If necessary, zero padding may be performed.

Here, the fallback DCI is, for example, DCI transmitted in at least one of a common search space (CSS) or a user terminal-specific search space (UE-specific search space (USS)), and may be DCI whose configuration (contents, payload size, or the like) cannot be configured by UE-specific higher layer signaling (for example, radio resource control (RRC) signaling). The fallback DCI may be used before RRC connection.

The fallback DCI for scheduling a physical downlink shared channel (PDSCH) may be referred to as a DCI format 1_0, and the fallback DCI for scheduling a physical uplink shared channel (PUSCH) may be referred to as a DCI format 0_0.

Note that the configuration (contents, payload, or the like) of the fallback DCI may be configurable by higher layer signaling (for example, broadcast information, system information, and the like) common to UEs.

Non-fallback DCI is, for example, DCI transmitted in the USS, and may be DCI whose configuration (contents, payload size, or the like) can be configured by UE-specific higher layer signaling (for example, RRC signaling). The fallback DCI may be used after the RRC connection.

The non-fallback DCI for scheduling the PDSCH may be referred to as a DCI format 1_1, and the non-fallback DCI for scheduling the PUSCH may be referred to as a DCI format 0_1.

The configuration (contents, payload size, or the like) of the new DCI format may be configured by higher layer signaling.

Since the number of DCI sizes monitored by the UE is limited as described above, it is conceivable that the size of the new DCI format is aligned with the size of the fallback DCI by DCI size adjustment in a case where the size of the new DCI format is different from the size of the fallback DCI.

Figure 1:
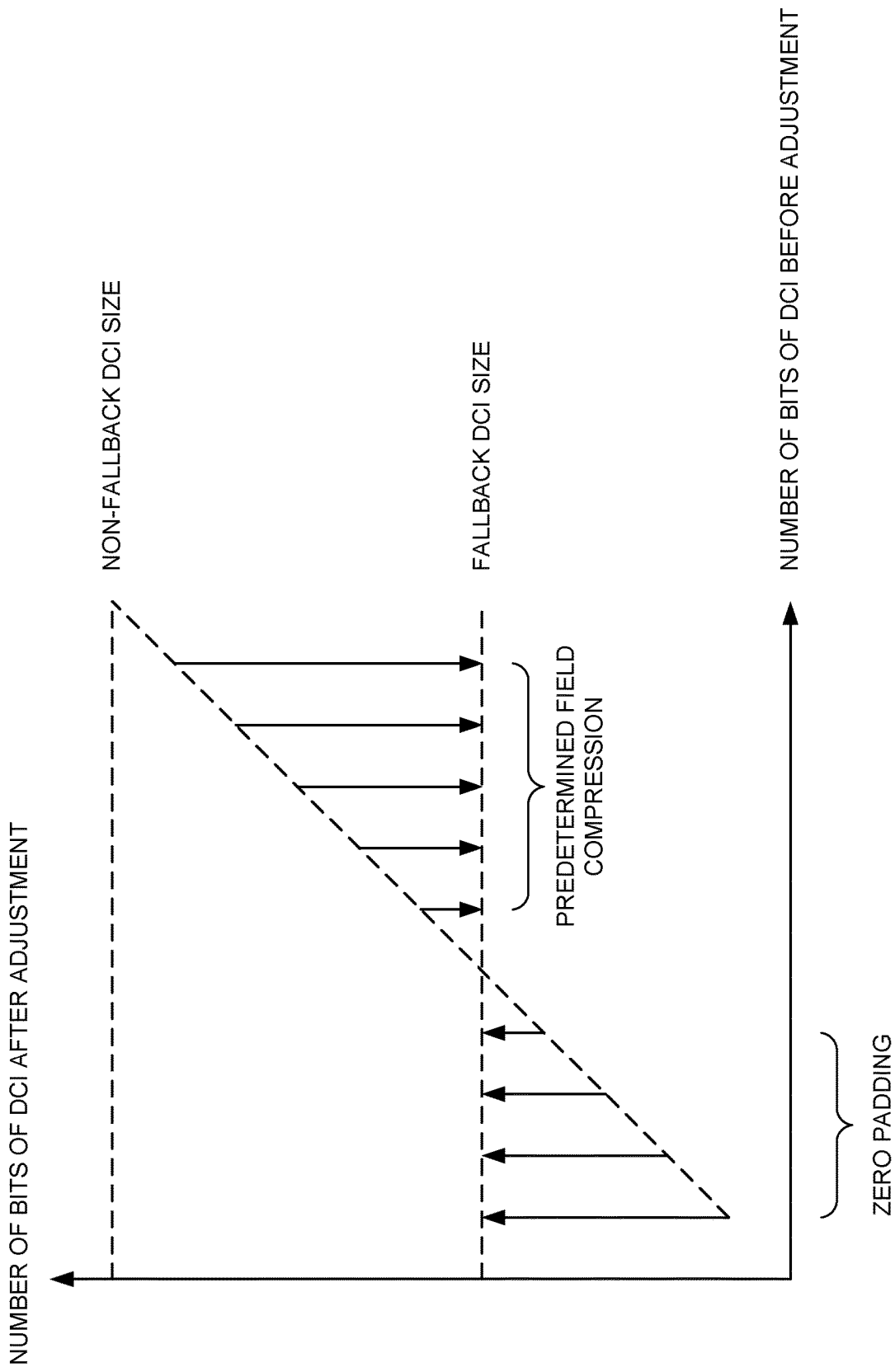
FIG. 1 is a diagram for describing a downlink control information (DCI) size.

In a case where the size of the DCI format is smaller than the size of the fallback DCI, the DCI size adjustment is simple since it is sufficient that only zero padding is performed. In a case where the size of the DCI format is larger than the size of the fallback DCI, in the DCI size adjustment, it is necessary to compress one or more fields in the DCI format (see FIG. 1).

For example, it is conceivable to reduce the size of a given field included in a DCI in a case where a DCI format smaller in size than the fallback DCI is defined, or in a case where the size of the DCI format is reduced by the DCI size adjustment (alternatively, size reduction).

The present inventors have focused on a time domain resource allocation (TDRA) field as the given field included in the DCI.

<Time Domain Resource Allocation>

[PDSCH]

The size (the number of bits) of the TDRA field in the DCI (DL assignment, for example, the DCI format 1_0 or 1_1) used for PDSCH scheduling may be fixed or variable.

For example, the size of the TDRA field in the DCI format 1_0 may be fixed to a given number of bits (for example, 4 bits). On the other hand, the size of the TDRA field in the DCI format 1_1 may be the number of bits that varies depending on a given parameter (for example, 0 to 4 bits).

The given parameter used to determine the size of the TDRA field may be, for example, the number of entries in a list of time domain allocation with respect to the PDSCH (or downlink data) (PDSCH time domain allocation list).

For example, the PDSCH time domain allocation list may be, for example, an RRC control element "pdsch-TimeDomainAllocationList" or "PDSCH-TimeDomainResourceAllocationList". Further, the PDSCH time domain allocation list may be used to configure a time domain relationship between a physical downlink control channel (PDCCH) and the PDSCH. Further, each entry in the PDSCH time domain allocation list may be referred to as allocation information of a time domain resource with respect to the PDSCH (PDSCH time domain allocation information) or the like, or may be, for example, an RRC control element "PDSCH-TimeDomainResourceAllocation".

Further, the PDSCH time domain allocation list may be included in a cell-specific PDSCH parameter (for example, the RRC control element "pdsch-ConfigCommon") or may be included in a UE-specific parameter (UE-specific parameter applied to a specific BWP) (for example, the RRC control element "pdsch-Config"). As described above, the PDSCH time domain allocation list may be cell-specific or UE-specific.

FIG. 2 is a diagram illustrating an example of the PDSCH time domain allocation list. As illustrated in FIG. 2, each piece of PDSCH time domain allocation information in the PDSCH time domain allocation list may include at least one of information indicating a time offset K0 (also referred to as k0, $K_0$, or the like) between the DCI and the PDSCH scheduled by the DCI (also referred to as offset information, K0 information, or the like), information indicating a mapping type of the PDSCH (mapping type information), and at least one of a starting symbol S or a time length L of the PDSCH. In addition, a combination of the starting symbol S and the time length L of the PDSCH may be referred to as a start and length indicator (SLIV).

Alternatively, the given parameter used to determine the size of the TDRA field may be the number of entries of a default table (for example, default PDSCH time domain allocation A) for time domain allocation with respect to the PDSCH or the downlink data. The default table may be defined in advance in a specification. In each row of the default table, at least one of a row index, information indicating the position of a demodulation reference signal (DMRS), the mapping type information, the K0 information, information indicating the starting symbol S of the PDSCH, or information indicating the number L of symbols allocated to the PDSCH may be associated.

The UE may determine the row index (entry number or entry index) of a given table based on the value of the TDRA field in the DCI (for example, the DCI format 1_0 or 1_1). The given table may be a table based on the PDSCH time domain allocation list or may be the default table.

Figures 3A, 3B:
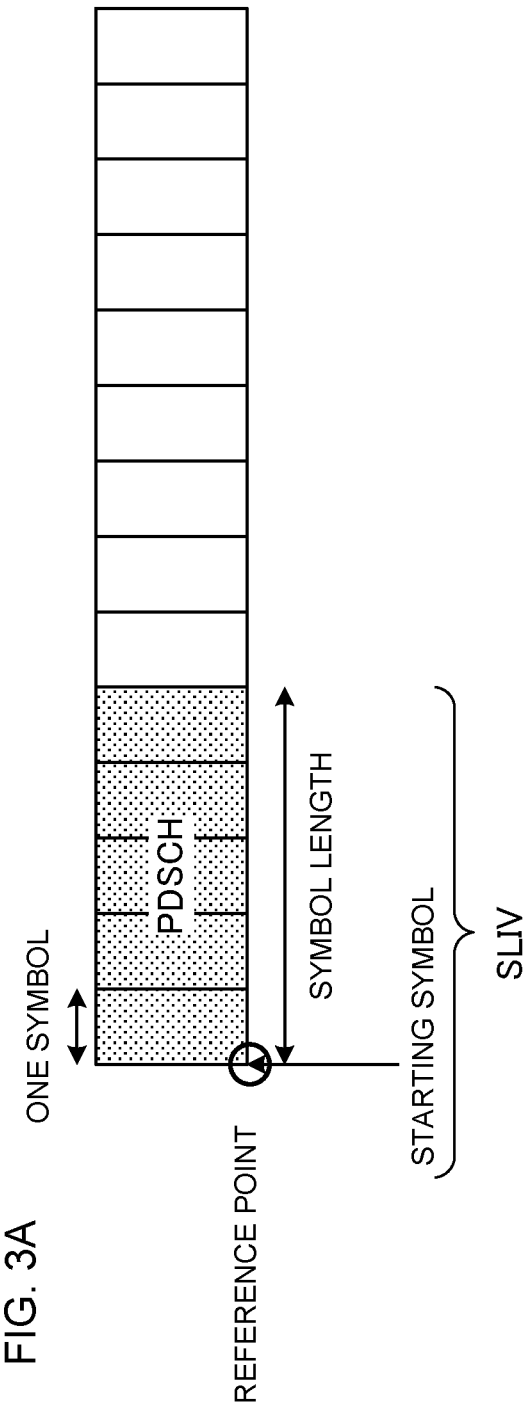
FIGS. 3A and 3B are diagrams illustrating an example of an allocation control for a physical downlink shared channel (PDSCH).

The UE may determine the time domain resource (for example, a given number of symbols) allocated to the PDSCH in a given slot (one or more slots) based on at least one of the K0 information, the mapping type, the starting symbol S, the symbol length L, or the SLIV defined in the row (or entry) corresponding to the row index (see FIG. 3A). Note that a reference point of the starting symbol S and the symbol length L is controlled based on a starting position (head symbol) of a slot. In addition, the starting symbol S, the symbol length L, and the like may be defined according to the mapping type of the PDSCH (see FIG. 3B).

Note that the K0 information may indicate the time offset K0 between the DCI and the PDSCH scheduled by the DCI by the number of slots. The UE may determine a slot for receiving the PDSCH by the time offset K0. For example, when receiving the DCI for scheduling the PDSCH in a slot #n, the UE may determine the slot for receiving the PDSCH (allocated to the PDSCH) based on the number n of the slot and at least one of PDSCH subcarrier spacing $\mu_{PDSCH}$, PDCCH subcarrier spacing $\mu_{PDCCH}$, or the time offset K0.

[PUSCH]

The size (the number of bits) of the TDRA field in the DCI (UL grant, for example, the DCI format 0_0 or 0_1) used for PUSCH scheduling may be fixed or variable.

For example, the size of the TDRA field in the DCI format 0_0 may be fixed to a given number of bits (for example, 4 bits). On the other hand, the size of the TDRA field in the DCI format 0_1 may be the number of bits that varies depending on a given parameter (for example, 0 to 4 bits).

The given parameter used to determine the size of the TDRA field may be, for example, the number of entries in a list of time domain allocation with respect to the PUSCH (or uplink data) (PUSCH time domain allocation list).

For example, the PUSCH time domain allocation list may be, for example, an RRC control element "pusch-TimeDomainAllocationList" or "PUSCH-TimeDomainResourceAllocationList". Further, each entry in the PUSCH time domain allocation list may be referred to as allocation information of a time domain resource with respect to the PUSCH (PUSCH time domain allocation information) or the like, and may be, for example, an RRC control element "PUSCH-TimeDomainResourceAllocation".

Further, the PUSCH time domain allocation list may be included in a cell-specific PUSCH parameter (for example, an RRC control element "pusch-ConfigCommon") or may be included in a UE-specific parameter (UE-specific parameter applied to a specific bandwidth part (BWP)) (for example, an RRC control element "pusch-Config"). As described above, the PUSCH time domain allocation list may be cell-specific or UE-specific.

Each piece of PUSCH time domain allocation information in the PUSCH time domain allocation list may include at least one of information indicating a time offset K2 (also referred to as k2, $K_2$, or the like) between the DCI and the PUSCH scheduled by the DCI (also referred to as offset information, K2 information, or the like), information indicating a mapping type of the PUSCH (mapping type information), and an index (start and length indicator (SLIV)) giving a combination of a starting symbol and a time length of the PUSCH.

Alternatively, the given parameter used to determine the size of the TDRA field may be the number of entries of a default table (for example, default PUSCH time domain allocation A) for time domain allocation with respect to the PUSCH or the uplink data. The default table may be defined in advance in a specification. In each row of the default table, at least one of a row index, the mapping type information, the K2 information, information indicating the starting symbol S of the PUSCH, or information indicating the number L of symbols allocated to the PUSCH may be associated.

The UE may determine the row index (entry number or entry index) of a given table based on the value of the TDRA field in the DCI (for example, the DCI format 0_0 or 0_1). The given table may be a table based on the PUSCH time domain allocation list or may be the default table.

The UE may determine the time domain resource (for example, a given number of symbols) allocated to the PUSCH in a given slot (one or more slots) based on at least one of the K2 information, the SLIV, the starting symbol S, or the time length L defined in the row (or entry) corresponding to the row index.

Note that the K2 information may indicate the time offset K2 between the DCI and the PUSCH scheduled by the DCI by the number of slots. The UE may determine a slot for transmitting the PUSCH by the time offset K2. For example, when receiving the DCI for scheduling the PUSCH in the slot #n, the UE may determine the slot for transmitting the PUSCH (allocated to the PUSCH) based on the number n of the slot and at least one of PUSCH subcarrier spacing $\mu_{PUSCH}$, PDCCH subcarrier spacing $\mu_{PDCCH}$, or the time offset K2.

When compressing or reducing (hereinafter, also simply referred to as reducing) the time domain resource allocation field described above, how to reduce the size (or bit width) of the TDRA field becomes a problem. In a case where the time domain resource allocation field is not appropriately reduced, there is a possibility that communication is not appropriately performed.

As an aspect of the present invention, the present inventors have focused on the time domain resource allocation (TDRA) field as the given field included in the DCI, and conceived a method for appropriately performing communication even in a case where the time domain resource allocation field is reduced.

In addition, the present inventors conceived a control method in a case where a reference point of the time domain resource allocation (TDRA) is configured in a unit shorter than a slot according to another aspect of the present invention.

Hereinafter, an embodiment according to the present disclosure will be described in detail with reference to the drawings. The respective aspects may be applied independently or may be applied in combination. Note that the present invention is not necessarily limited to a configuration in which the size of the DCI is changed (for example, reduced), and can be applied to the DCI including the TDRA field. In addition, the following aspect can be applied to the shared channel (at least one of the PDSCH or the PUSCH).

In the present disclosure, the fallback DCI may be replaced with the fallback DCI for the eMBB, the DCI formats 0_0 and 1_0, first DCI, or the like. The non-fallback DCI may be replaced with the non-fallback DCI for the eMBB, the DCI formats 0_1 and 1_1, second DCI, or the like. Specific DCI, new DCI, the DCI for the URLLC, a specific DCI format, a new DCI format, and the DCI format for the URLLC may be replaced with each other.

(First Aspect)

In a first aspect, a reference point serving as a determination criterion for time domain resource allocation (TDRA) will be described.

In an existing system (for example, Rel. 15), the reference point serving as the determination criterion for the TDRA is defined by a start point of a slot which is a slot boundary. The UE determines allocation of the shared channel with reference to the start point of the slot for the resource allocation information (for example, the SLIV) specified in the TDRA field. Note that the reference point may be referred to as a reference point or a reference point.

In the first aspect, a configurable reference point is introduced other than the slot boundary (for example, the starting position of the slot). The starting position may be a starting symbol.

<Option 1>

The reference point may be configured at a given position in the slot. For example, in a case where the slot is divided into two or more sub-slots, the reference point may be configured at a boundary of each sub-slot (or a starting position of each sub-slot). In this case, the reference point is configured in the middle of the slot in addition to the existing reference point configured at the boundary of the slot. Note that the reference point may be configured only in the middle of the slot without providing the reference point at the slot boundary.

Figure 4:
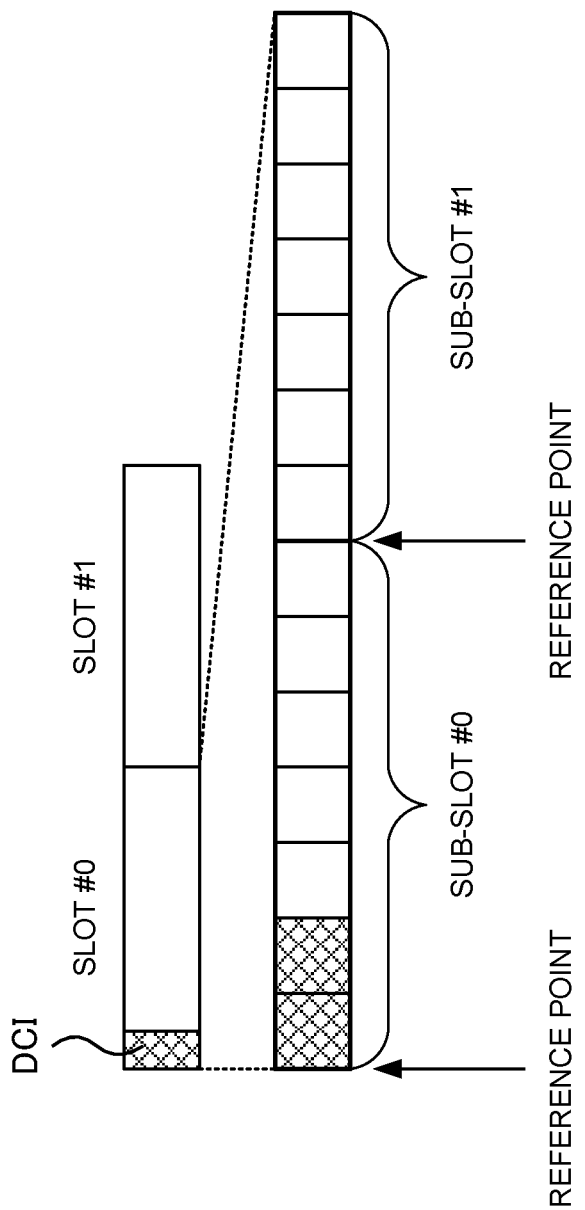
FIG. 4 is a diagram illustrating an example of configuration of a reference point.

FIG. 4 illustrates a case where two sub-slots correspond to one slot. For example, a slot #0 includes a sub-slot #0 and a sub-slot #1. In this case, the reference point is configured at boundaries of the sub-slot #0 and the sub-slot #1 (or a starting position of the sub-slot #0 and a starting position of the sub-slot #1).

When applying the reference point of the boundary of the sub-slot, the UE determines a starting symbol index (for example, S is any one of 0 to 6) and the symbol length (for example, L is any one of 1 to 6 (or 2 to 6)) based on the reference point.

As a result, since an index (for example, a value specified by the SLIV) of a start point of an allocated resource of the shared channel can be halved, the number of TDRA candidates (or TDRA entries) can be reduced.

FIG. 4 illustrates a case where two sub-slots are provided in one slot, but the number of sub-slots may be configured to three or more. In addition, one or more specific symbols in the slot may be specified as the reference point.

<Option 2>

The reference point may be configured based on an allocation candidate region or a monitoring region of the downlink control channel (alternatively, the downlink control information). For example, the reference point may be configured at a starting position (starting symbol) of a control resource set (CORESET) corresponding to an allocation candidate region or a monitoring region of the PDCCH (or DCI) (see FIG. 5A). The control resource set may include the DCI for scheduling the shared channel.

Figure 5A:
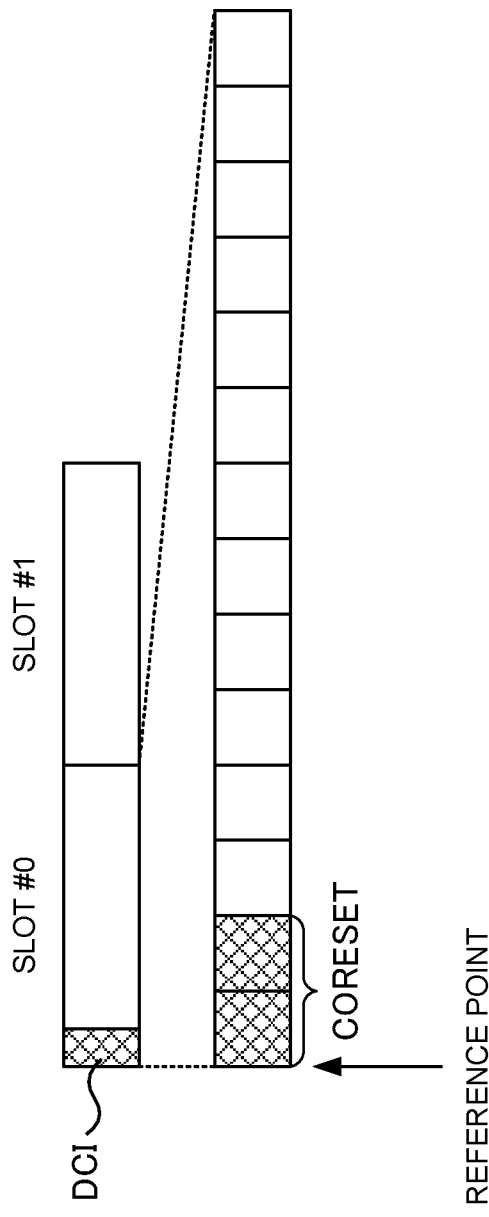
FIGS. 5A and 5B are diagrams illustrating another example of the configuration of the reference point.

FIG. 5A illustrates a case where the control resource set is configured at the first symbol (head symbol) and the second symbol in the slot #0. In this case, the reference point may be configured at the first symbol corresponding to the starting position of the control resource set.

Figure 5B:
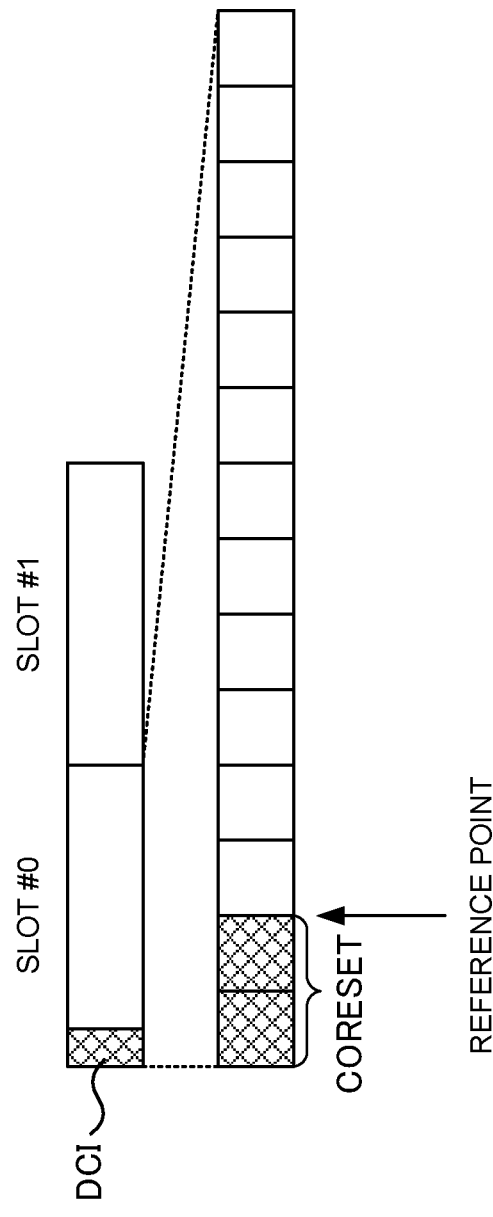

Alternatively, the reference point may be configured at an ending position (ending symbol) of the control resource set (see FIG. 5B). FIG. 5B illustrates a case where the control resource set is configured at the first symbol and the second symbol (ending symbol) in the slot #0. In this case, the reference point may be configured at the second symbol corresponding to the ending position of the control resource set.

Although FIGS. 5A and 5B illustrate a case where the control resource set is arranged from the head symbol of the slot, the starting position of the control resource set may be configured at the second and subsequent symbols.

Figure 6:
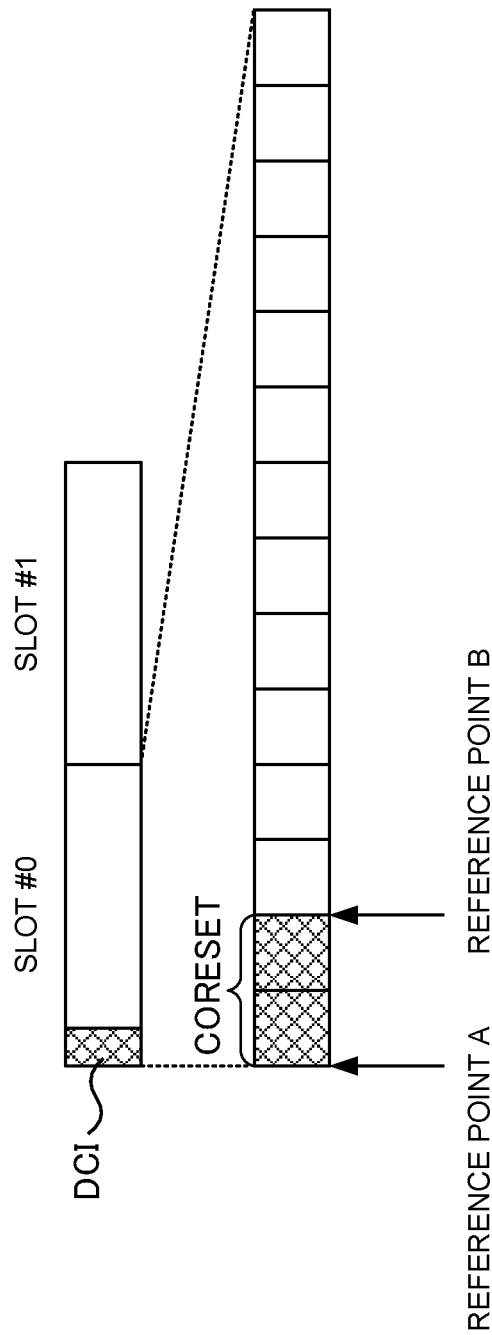
FIG. 6 is a diagram illustrating another example of the configuration of the reference point.

Alternatively, the reference point may be configured at both the starting position (starting symbol) and the ending position (ending symbol) of the control resource set (see FIG. 6). FIG. 6 illustrates a case where the control resource set is configured at the first symbol and the second symbol in the slot #0. In this case, the reference point may be configured at the first symbol corresponding to the starting position of the control resource set and the second symbol corresponding to the ending position.

<Selection of Reference Point>

In a case where a plurality of reference points are set for one slot (for example, FIGS. 4, 6, and the like), the reference point to be applied may be determined based on a given condition. For example, the UE may determine the reference point to be applied based on at least one of the following determination methods.

[Determination Method 1]

Information regarding the reference point to be applied may be included in the DCI. That is, the UE may determine the reference point when determining allocation of the shared channel based on the information included in the DCI. The information included in the DCI is only required to be information for identifying the reference point, and may be, for example, information specifying the sub-slot (for example, a sub-slot ID).

For example, a field used to identify the reference point may be configured in the DCI (see FIG. 7A). The field for identifying the reference point may be referred to as a reference ID field, a reference ID identification field, or a reference ID field. The reference ID field may be configured to a given number of bits (for example, one bit). The reference ID field may also be configured separately from the time domain resource allocation field (0 to 4 bits).

In a case where the reference ID field (for example, one bit) is "0", the UE may determine the time domain resource allocation by using a reference point A (see FIGS. 7A to 7C). On the other hand, in a case where the reference ID field is "1", the UE may determine the time domain resource allocation by using a reference point B (see FIGS. 7A to 7C). Note that FIG. 7B illustrates a case where the reference points A and B are configured on a sub-slot basis, and FIG. 7C illustrates a case where the reference points A and B are configured on a control resource set basis.

Also, in a case where the reference ID field is not included in the DCI, the UE may determine the time domain resource allocation based on a given reference point (for example, a default reference point). The given reference point may be the first reference point in the slot (for example, a starting symbol of the first sub-slot or a starting symbol of the control resource set).

As described above, a configuration in which the reference ID field is not included in the DCI is allowed, such that the number of bits of the DCI can be reduced. In addition, when a specific communication condition or communication service (for example, the URLLC) is applied, the DCI from which the reference ID field is deleted may be applied. Since the operation of selecting the reference point is omitted, it is possible to suppress an increase in processing load of the UE and lower the latency.

[Determination Method 2]

The information regarding the reference point to be applied may be included in a part of the TDRA field of the DCI. That is, the UE may determine the reference point and the time domain allocation resource from the reference point when determining allocation of the shared channel based on the information regarding the TDRA included in the DCI. The information included in a part of the TDRA field is only required to be the information for identifying the reference point, and may be, for example, information specifying the sub-slot (for example, the sub-slot ID).

Figure 8:
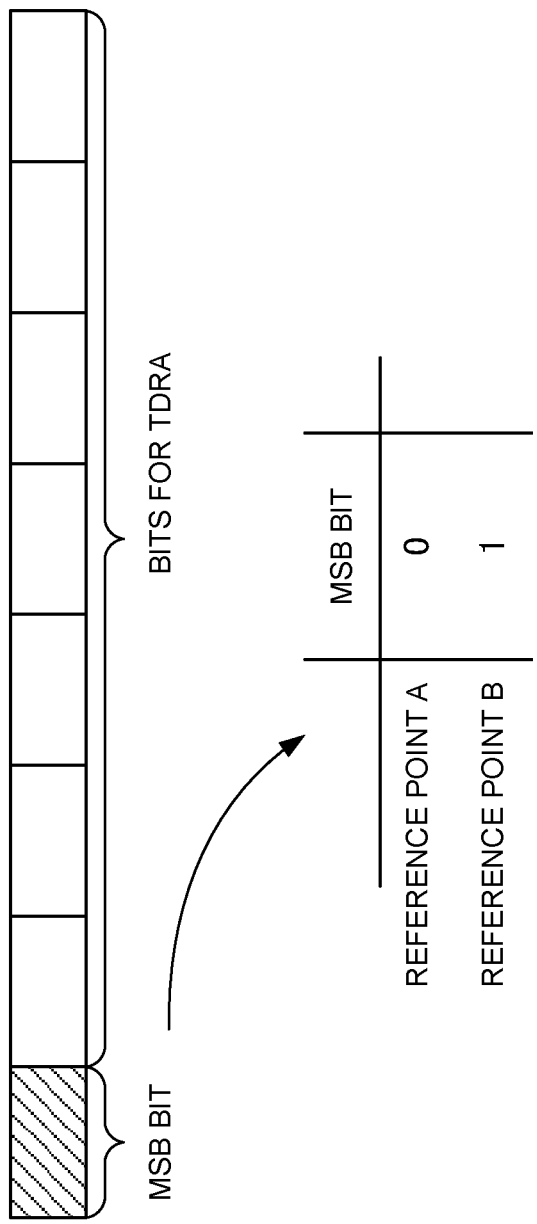
FIG. 8 is a diagram illustrating another example of the method of performing notification of the information regarding the reference point.

For example, a bit used to identify the reference point may be configured at a part of the TDRA field (see FIG. 8). The bit for identifying the reference point may be referred to as a reference ID bit, a reference ID identification bit, or a reference ID bit. The reference ID bit may be provided at either the most significant bit (MSB bit) or the least significant bit (LSB bit) of the TDRA field.

In a case where the reference ID bit (for example, one bit) is "0", the UE determines the time domain resource allocation by using the reference point A. On the other hand, in a case where the reference ID bit is "1", the UE determines the time domain resource allocation by using the reference point B.

[Determination Method 3]

The reference point to be applied may be determined based on an index of the TDRA table (for example, row index) or a bit specified in the TDRA field (for example, m).

For example, the UE determines the time domain resource allocation by using the reference point A in a case where the index of the TDRA table specified in the DCI is odd. On the other hand, the UE determines the time domain resource allocation by using the reference point B in a case where the index of the TDRA table specified in the DCI is even.

As a result, notification of the information for reference point identification can be made unnecessary.

[Determination Method 4]

The reference point to be applied may be determined based on a given parameter. The given parameter may be, for example, a mapping type of the shared channel (PDSCH or PUSCH) or another parameter.

For example, the UE determines the time domain resource allocation by using the reference point A in a case where the mapping type of the shared channel is A. On the other hand, the UE determines the time domain resource allocation by using the reference point B in a case where the mapping type of the shared channel is B.

As a result, notification of the information for reference point identification can be made unnecessary.

(Second Aspect)

In a second aspect, a UE operation in a case where the shared channel is arranged or scheduled across the sub-slot boundary or slot boundary will be described. In the following description, the downlink shared channel (for example, PDSCH) will be described as an example of the shared channel, but the same may apply to the uplink shared channel (for example, PUSCH).

It is also assumed that the shared channel is scheduled across the boundary of the sub-slots in a case where the slot is divided into the sub-slots and the reference point is configured as described in Option 1 of the first aspect above (see FIG. 9A). FIG. 9A illustrates an example in which the downlink shared channel (for example, PDSCH) is arranged over the sub-slot #0 and the sub-slot #1. Here, a case where the PDSCH is arranged at the seventh and eighth symbols in the slot based on the reference point configured at the sub-slot #0 is illustrated.

In addition, it is also assumed that the shared channel is scheduled across the boundary of the slots in a case where the reference point is configured based on the control resource set as described in Option 2 of the first aspect above (see FIG. 9B). FIG. 9B illustrates an example of a case where the downlink shared channel (for example, PDSCH) is arranged over the slot #0 and a slot #1. Here, a case where the PDSCH is arranged at thirteenth to fourteenth symbols of the slot #0 and the first and second symbols of the slot #1 based on the reference point configured at the starting position or ending position of the control resource set of the slot #0 is illustrated.

In such a case, the UE may apply at least one of a drop operation, a truncating operation, or a scheduling operation of the PDSCH.

<Drop Operation>

In a case where the PDSCH is allocated across the boundary of the sub-slots, the UE may control not to transmit (for example, drop) the PDSCH (see FIG. 10A). FIG. 10A illustrates an example of a case of dropping the PDSCH allocated over the sub-slot #0 and the sub-slot #1.

In a case where the PDSCH is allocated across the boundary of the slots, the UE may control not to transmit (for example, drop) the PDSCH (see FIG. 10B). FIG. 10B illustrates an example of a case of dropping the PDSCH allocated over the slot #0 and the slot #1.

In this manner, by dropping the PDSCH allocated across the boundary of the sub-slots or the boundary of the slots, it is possible to suppress the occurrence of collision with another signal and/or channel and to suppress complication of control of transmit power. Note that the drop operation may be performed on one of the PDSCH arranged over the boundary of the sub-slots and the PDSCH arranged over the boundary of the slots, and the drop operation is not performed on the other. The truncating operation or scheduling operation may be applied to the PDSCH that is not subjected to the drop operation.

<Truncating Operation>

Figure 11A:
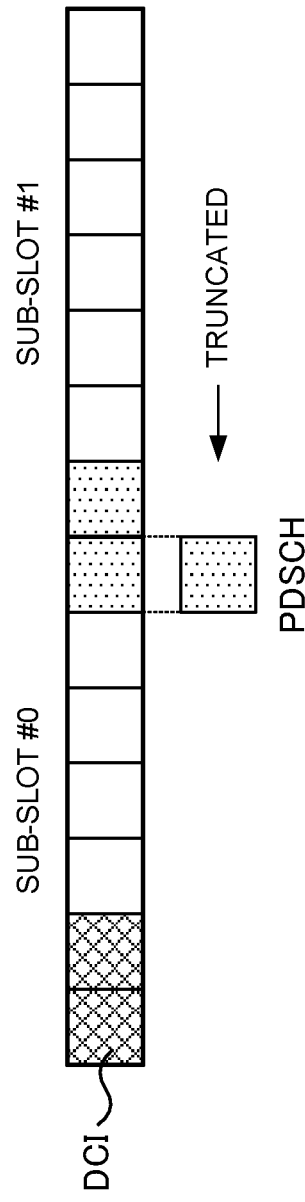
FIGS. 11A and 11B are diagrams illustrating another example of the UE operation in a case where the shared channel is arranged across the sub-slot boundary or the slot boundary.

In a case where the PDSCH is allocated across the boundary of the sub-slots, the UE may control to truncate the PDSCH allocated to one sub-slot and transmit the PDSCH by using the other sub-slot (see FIG. 11A). In FIG. 11A, in the PDSCH allocated over the sub-slot #0 and the sub-slot #1, the PDSCH of one sub-slot (here, the sub-slot #1) is truncated or deleted. An example of a case where the PDSCH of the other sub-slot (here, the sub-slot #0) is transmitted is illustrated.

The UE may collectively transmit the PDSCH of one sub-slot with the PDSCH of the other sub-slot. In this case, the UE may compress and transmit the PDSCH of the other sub-slot. The sub-slot for the PDSCH may be fixedly determined (for example, the first half sub-slot) or may be the sub-slot in which the DCI for scheduling the PDSCH is arranged.

As described above, by transmitting the PDSCH of one sub-slot, the PDSCH can be transmitted even in a case where the PDSCH is arranged over the sub-slot boundary.

Figure 11B:
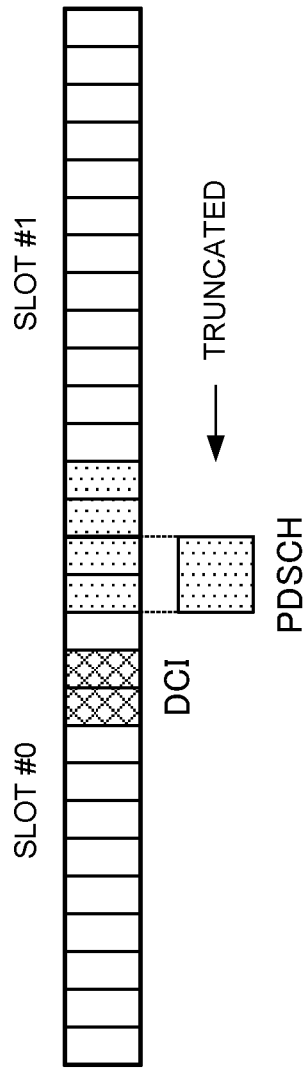

In a case where the PDSCH is allocated across the boundary of the slots, the UE may control to truncate the PDSCH allocated to one slot and transmit the PDSCH by using the other slot (see FIG. 11B). In FIG. 11B, in the PDSCH allocated over the slot #0 and the slot #1, the PDSCH of one slot (here, the slot #1) is truncated or deleted.

An example of a case where the PDSCH of the other slot (here, the slot #0) is transmitted is illustrated.

The UE may collectively transmit the PDSCH of one slot with the PDSCH of the other slot. In this case, the UE may compress and transmit the PDSCH of the other slot. The slot for the PDSCH may be fixedly determined (for example, the first half slot) or may be the slot in which the DCI for scheduling the PDSCH is arranged.

As described above, by transmitting the PDSCH of one slot, the PDSCH can be transmitted even in a case where the PDSCH is arranged over the slot boundary.

Note that the truncating operation may be performed on one of the PDSCH arranged over the boundary of the sub-slots and the PDSCH arranged over the boundary of the slots, and the truncating operation is not performed on the other. The drop operation or scheduling operation may be applied to the PDSCH that is not subjected to the truncating operation.

<Scheduling Operation>

Figure 12A:
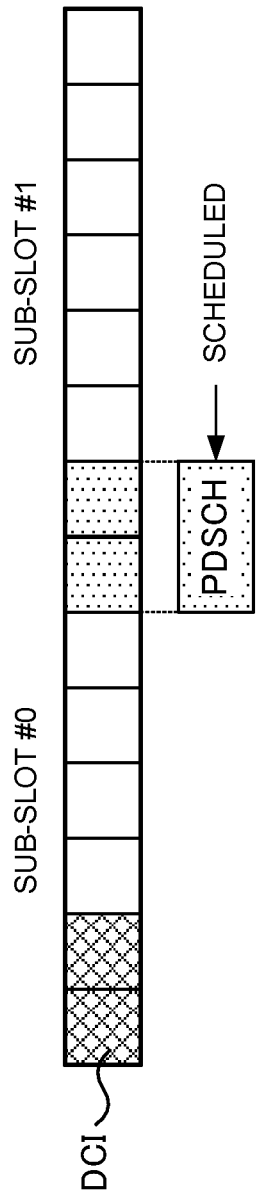
FIGS. 12A and 12B are diagrams illustrating another example of the UE operation in a case where the shared channel is arranged across the sub-slot boundary or the slot boundary.

In a case where the PDSCH is allocated across the boundary of the sub-slots, the UE may control to transmit the PDSCH (see FIG. 12A). FIG. 12A illustrates an example of a case where the PDSCH allocated over the sub-slot #0 and the sub-slot #1 is transmitted according to scheduling.

Figure 12B:
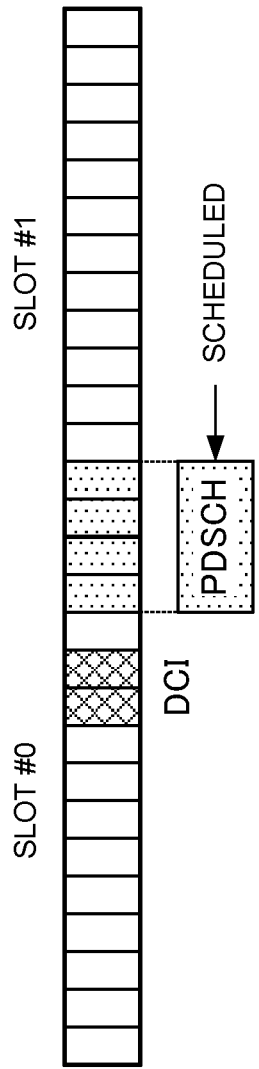

In a case where the PDSCH is allocated across the boundary of the slots, the UE may control to transmit the PDSCH (see FIG. 12B). FIG. 12B illustrates an example of a case where the PDSCH allocated over the slot #0 and the slot #1 is transmitted according to scheduling.

As described above, by allowing the scheduling of the PDSCH allocated across the boundary of the sub-slots or the boundary of the slots, an allocation restriction of the PDSCH can be eliminated, and the scheduling can be flexibly controlled. Note that the scheduling operation may be performed on one of the PDSCH arranged over the boundary of the sub-slots and the PDSCH arranged over the boundary of the slots, and the scheduling operation is not performed on the other. The drop operation or truncating operation may be applied to the PDSCH that is not subjected to the scheduling operation.

(Third Aspect)

In a third aspect, a case where the UE determines, based on a given condition, granularity (for example, a level at which the reference point is configured) at which the reference point for the time domain resource allocation is configured will be described.

The UE may determine the granularity (for example, in units of slots, in units of sub-slots, or in units of a given number of symbols) at which the reference point for the time domain resource allocation is configured based on at least one of the information whose notification is performed from the network (for example, a base station) or the given parameter. For example, the UE may determine the reference point to be applied based on at least one of the following Methods 1 to 10.

<Method 1>

The UE may determine the granularity at which the reference point is configured based on the DCI format. For example, in a case where the DCI is transmitted using a first DCI format, the UE applies the reference point configured in a first unit to the TDRA whose notification is performed by the DCI. The first unit may be a slot unit (for example, the slot boundary).

On the other hand, in a case where the DCI is transmitted using a second DCI format, the UE applies the reference point configured in a second unit to the TDRA whose notification is performed by the DCI. The second unit may be a unit shorter than the slot unit (for example, the sub-slot boundary).

The first DCI format may be the DCI format 1_0, 1_1, 0_0, or 0_1. The second DCI format may be a DCI format different from the DCI formats 1_0, 1_1, 0_0, and 0_1. For example, the second DCI format may be a format configured for a specific traffic type (for example, URLLC).

As a result, it is possible to switch the granularity at which the reference point is configured based on the DCI format to be applied.

<Method 2>

The UE may determine the granularity at which the reference point is configured based on the field included in the DCI. For example, in a case where a specific field is not included in the DCI, the UE applies the reference point configured in the first unit (for example, the slot unit) to the TDRA whose notification is performed by the DCI. On the other hand, in a case where the specific field is included in the DCI, the UE applies the reference point configured in the second unit (for example, a unit shorter than the slot unit) to the TDRA whose notification is performed by the DCI.

The specific field may be at least one of a field for specifying a repetition factor, a field for specifying a priority (priority indicator), or a field for specifying a PDSCH group (PDSCH grouping indication). Alternatively, the specific field may be a new field that is not included in the existing DCI format 1_0, 1_1, 0_0, or 0_1 (for example, Rel. 15).

As a result, it is possible to switch the granularity at which the reference point is configured based on the DCI to be applied.

<Method 3>

The UE may determine the granularity at which the reference point is configured based on a combination of the fields included in the DCI. For example, in a case where a combination of specific fields is not included in the DCI, the UE applies the reference point configured in the first unit (for example, the slot unit) to the TDRA whose notification is performed by the DCI. On the other hand, in a case where the combination of the specific fields is included in the DCI, the UE applies the reference point configured in the second unit (for example, a unit shorter than the slot unit) to the TDRA whose notification is performed by the DCI.

The combination of the specific fields may be a combination of at least two of a field for specifying a repetition factor, a field for specifying a priority (priority indicator), and a field for specifying a PDSCH group (PDSCH grouping indication).

As a result, it is possible to switch the granularity at which the reference point is configured based on the DCI to be applied.

<Method 4>

The UE may determine the granularity at which the reference point is configured based on some bits of the TDRA field included in the DCI. For example, in a case where some bits of the TDRA of the DCI are 0, the UE applies the reference point configured in the first unit (for example, in the slot unit) to the TDRA whose notification is performed by the DCI. On the other hand, in a case where some bits of the TDRA of the DCI are 1, the UE applies the reference point configured in the second unit (for example, a unit shorter than the slot unit) to the TDRA whose notification is performed by the DCI.

Figure 13:
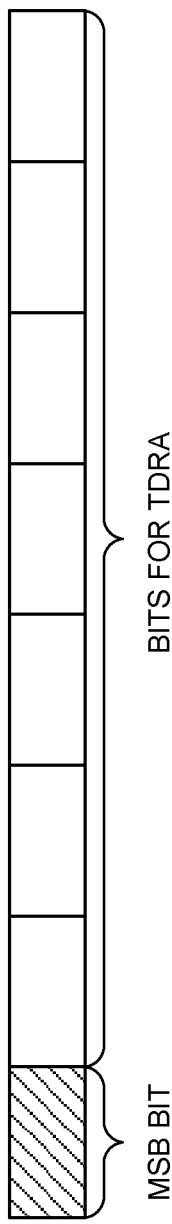
FIG. 13 is a diagram illustrating an example of a method of performing notification of information regarding granularity of the reference point.

Some bits of the TDRA may be the most significant bit (MSB) or the least significant bit (LSB) (see FIG. 13).

As a result, it is possible to switch the granularity at which the reference point is configured based on the DCI to be applied.

<Method 5>

The UE may determine the granularity at which the reference point is configured based on the information whose notification is performed by higher layer signaling. For example, the granularity at which the reference point is configured using a higher layer parameter related to the time domain resource allocation of the PDSCH or the PUSCH may be configured in the UE (see FIG. 14A). Here, a case where any one of the slot, the sub-slot, and the control resource set is configured as the granularity of the reference point is illustrated.

As a result, it is possible to switch the granularity at which the reference point is configured by a configuration of higher layer signaling.

<Method 6>

The UE may determine the granularity at which the reference point is configured based on information whose notification is performed by higher layer signaling and the DCI. For example, the granularity at which the reference point is configured using the higher layer parameter related to the time domain resource allocation of the PDSCH or the PUSCH may be configured in the UE (see FIG. 14B). Here, a case where any one of the slot, the sub-slot, the control resource set, and dynamic is configured as the granularity of the reference point is illustrated.

In a case where the slot, the sub-slot, or the control resource set is configured by higher layer signaling, the UE assumes that the reference point is configured at the configured granularity. In a case where dynamic is configured by higher layer signaling, the UE may determine the granularity at which the reference point is configured based on the information whose notification is performed by the DCI. For notification of the granularity of the reference point using the DCI, any one of Methods 1 to 4 described above may be used.

As a result, it is possible to flexibly switch the granularity at which the reference point is configured using higher layer signaling or the DCI.

<Method 7>

The UE may determine the granularity at which the reference point is configured based on the type or kind of the RNTI used for the CRC scrambling of the PDCCH (or DCI) used for scheduling the shared channel. For example, in a case where the shared channel is scheduled by the PDCCH scrambled with a first type RNTI, the UE applies the reference point configured in the first unit (for example, in the slot unit) to the TDRA whose notification is performed by the DCI. The first type RNTI may be a C-RNTI.

On the other hand, in a case where the shared channel is scheduled by the PDCCH scrambled with a second type RNTI, the UE applies the reference point configured in the second unit (for example, a unit shorter than the slot unit) to the TDRA whose notification is performed by the DCI. The second type RNTI may be a CS-RNTI.

As a result, it is possible to switch the granularity at which the reference point is configured based on the type of the RNTI.

<Method 8>

The UE may determine the granularity at which the reference point is configured based on the type of the MCS table specified by the DCI (alternatively, the type of the MCS table applied to the shared channel). For example, in a case where the shared channel is scheduled using a first MCS table (or the first MCS table is specified by the DCI), the UE applies the reference point configured in the first unit (for example, in the slot unit) to the TDRA whose notification is performed by the DCI. The first MCS table may be a 64 QAM MCS table.

On the other hand, in a case where the shared channel is scheduled using a second MCS table (or the second MCS table is specified by the DCI), the UE applies the reference point configured in the second unit (for example, a unit shorter than the slot unit) to the TDRA whose notification is performed by the DCI. The second MCS table may be an MCS table other than 64 QAM.

As a result, it is possible to switch the granularity at which the reference point is configured based on the type of the MCS table.

<Method 9>

The UE may determine the granularity at which the reference point is configured based on the type of a monitoring occasion (alternatively, a unit of the monitoring occasion) of the search space specified in the DCI. For example, in a case where the monitoring occasion of the PDCCH (or a search space for the PDCCH) is slot-based, the UE applies the reference point configured in the first unit (for example, in the slot unit) to the TDRA whose notification is performed by the DCI.

On the other hand, in a case where the monitoring occasion of the PDCCH (or the search space for the PDCCH) is across the slot boundary or the sub-slot boundary, the UE applies the reference point configured in the second unit (for example, a unit shorter than the slot unit) to the TDRA whose notification is performed by the DCI. For example, it may be assumed that the PDCCH monitoring occasion is the second unit in a case where an RRC control element "pdcch-MonitoringAnyOccasionsWithSpanGap" is configured.

As a result, it is possible to switch the granularity at which the reference point is configured based on the unit of the monitoring occasion of the search space.

<Method 10>

The UE may determine the granularity at which the reference point is configured based on the mapping type of the shared channel. For example, in a case where the mapping type of the shared channel is type A, the UE applies the reference point configured on a control resource set basis to the TDRA whose notification is performed by the DCI.

On the other hand, in a case where the mapping type of the shared channel is type B, the UE applies the reference point configured on a sub-slot basis to the TDRA whose notification is performed by the DCI.

As a result, it is possible to switch the granularity at which the reference point is configured based on the mapping type of the shared channel.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 15:
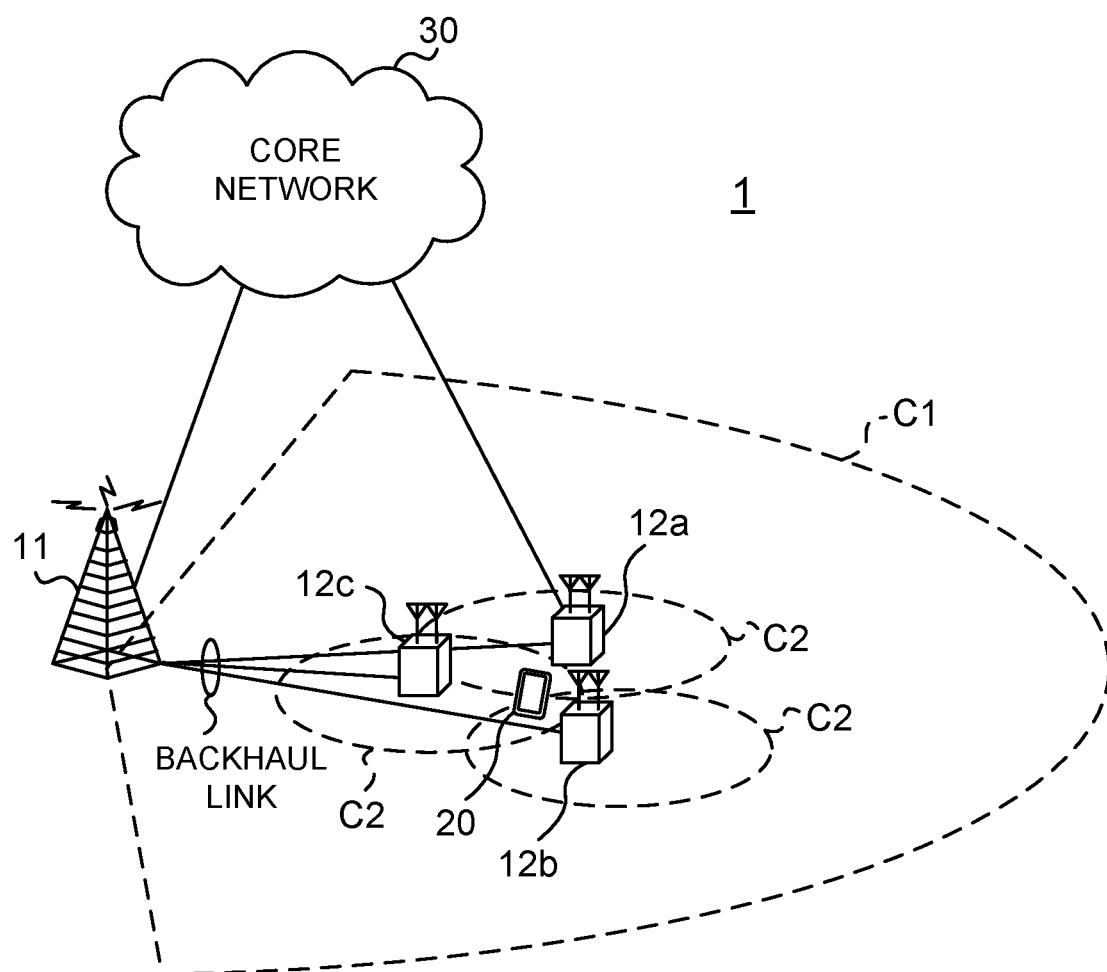
FIG. 15 is a diagram illustrating an example of a schematic configuration of a radio communication system according to one embodiment.

FIG. 15 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by 3rd generation partnership project (3GPP).

Furthermore, the radio communication system 1 may support dual connectivity between a plurality of radio access technologies (RATS) (multi-RAT dual connectivity (MR-DC)). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12*a* to 12*c*) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a wireless manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that, the DCI for scheduling the PDSCH may be referred to as DL assignment, DL DCI, or the like, and the DCI for scheduling the PUSCH may be referred to as UL grant, UL DCI, or the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, the DMRS may also be referred to as a user terminal-specific reference signal (UE-specific reference signal).

(Base Station)

Figure 16:
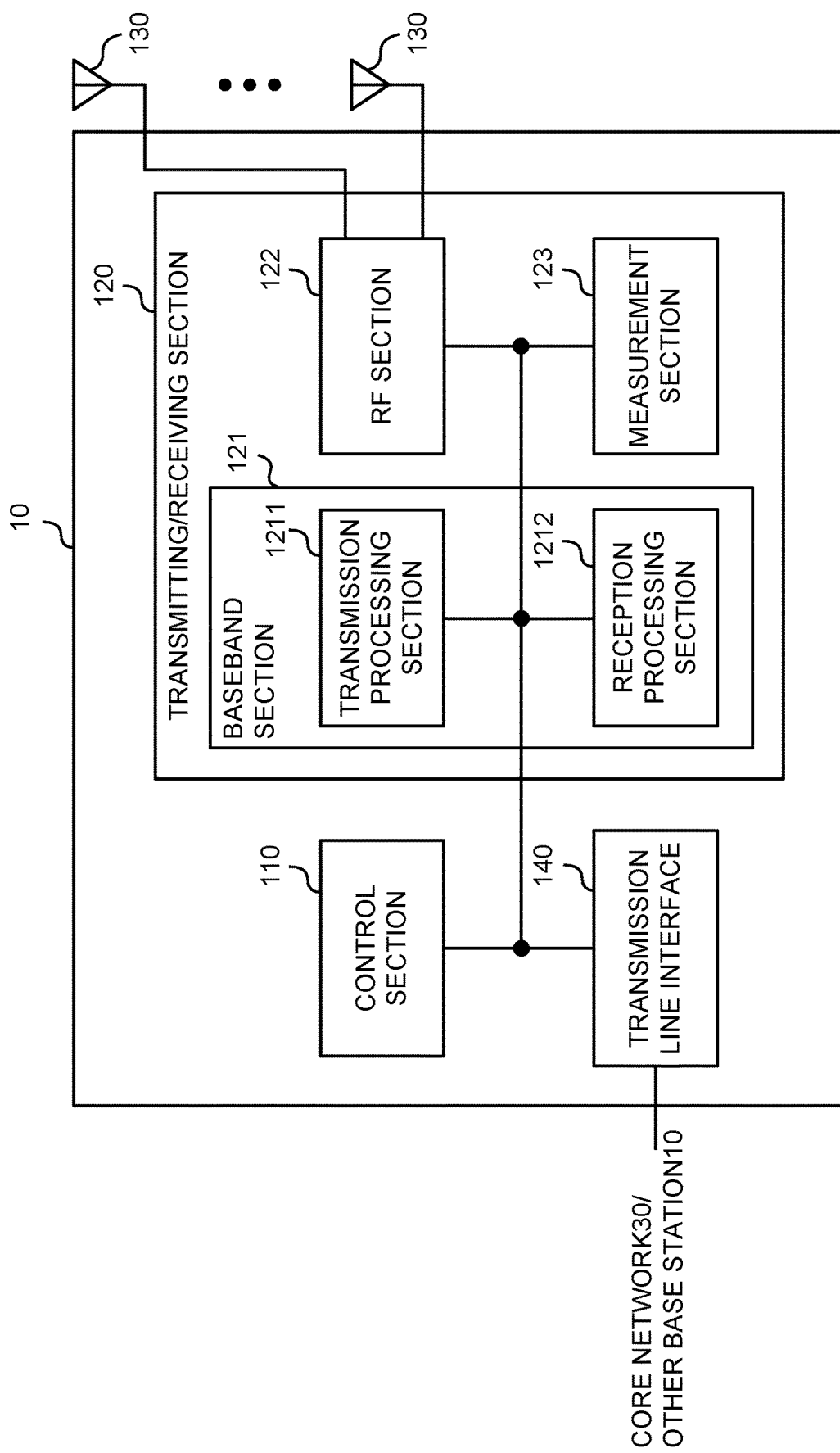
FIG. 16 is a diagram illustrating an example of a configuration of a base station according to one embodiment.

FIG. 16 is a diagram illustrating an example of a configuration of the base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be configured as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, to transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), or a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

Note that the transmitting/receiving section 120 transmits the downlink control information including the time domain resource allocation (TDRA) field. Furthermore, the transmitting/receiving section 120 may transmit information (for example, at least one of the reference point to be applied or the granularity of the reference point) regarding the reference point serving as a reference for the TDRA.

The control section 110 controls to specify an allocation position of a shared channel scheduled by the downlink control information based on a value specified in the TDRA field, and at least one of the reference point configured at an interval shorter than a slot, or the reference point configured based on an allocation position of the control resource set.

(User Terminal)

Figure 17:
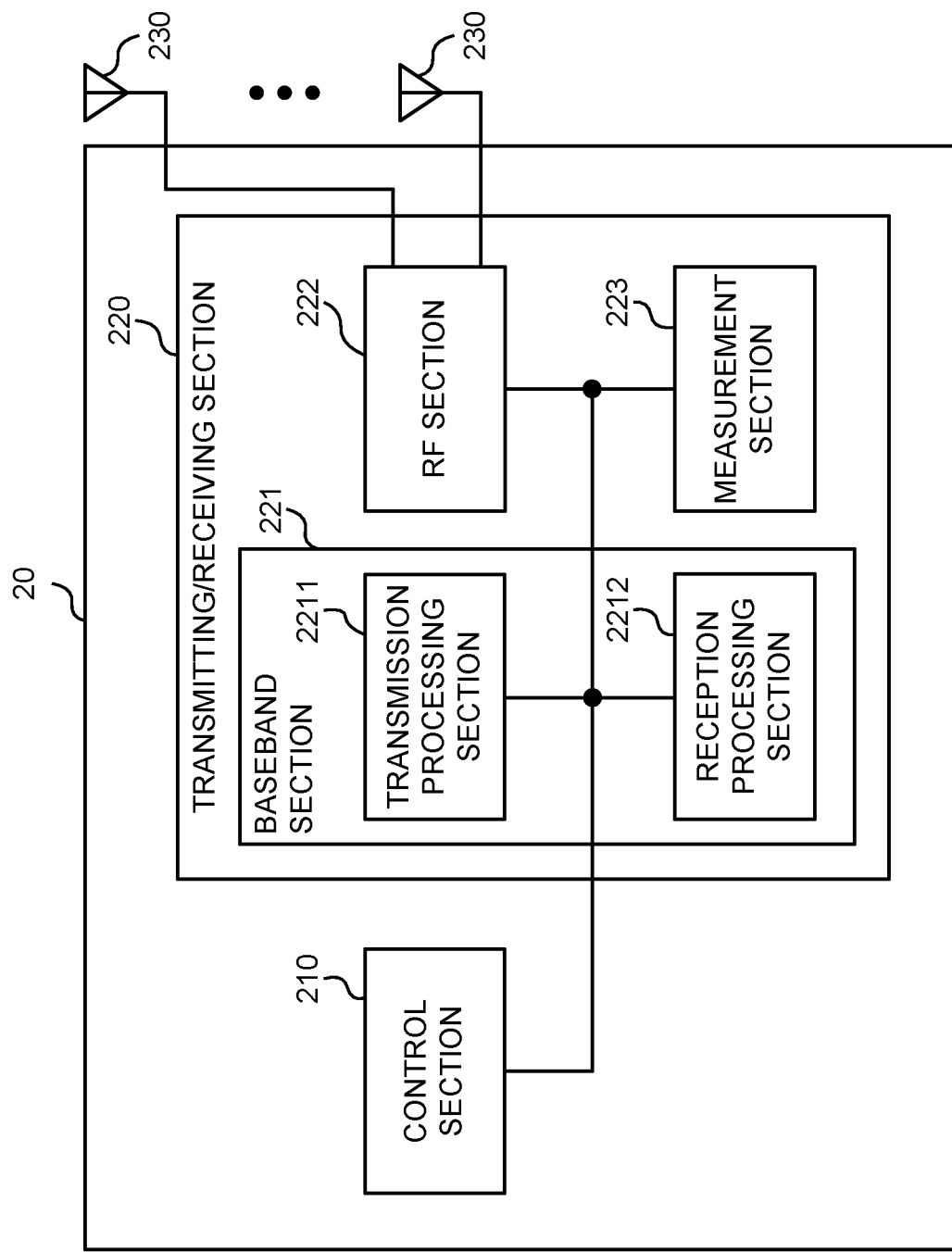
FIG. 17 is a diagram illustrating an example of a configuration of a user terminal according to one embodiment.

FIG. 17 is a diagram illustrating an example of a configuration of the user terminal according to one embodiment. The user terminal 20 includes a control section 210, a transmitting/receiving section 220, and a transmission/reception antenna 230. Note that one or more control sections 210, one or more transmitting/receiving sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like, which are described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like, which are described based on common recognition in the technical field related to the present disclosure.

The transmitting/receiving section 220 may be configured as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna, which is described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the above-described transmission processing in order to transmit the channel by using a DFT-s-OFDM waveform, and if not, the DFT processing does not have to be performed as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

Note that the transmitting/receiving section 220 receives the downlink control information including the time domain resource allocation (TDRA) field. Furthermore, the transmitting/receiving section 220 may receive information (for example, at least one of the reference point to be applied or the granularity of the reference point) regarding the reference point serving as a reference for the TDRA.

The control section 210 may determine the allocation position of the shared channel scheduled by the downlink control information based on the value specified in the TDRA field, and at least one of the reference point configured at an interval shorter than a slot, or the reference point configured based on an allocation position of the control resource set.

The control section 210 may determine at least one of the position or the granularity of the reference point to be applied based on the information included in the downlink control information. The TDRA field may include information regarding the reference point to be applied.

The control section 210 may determine the reference point to be applied based on the mapping type of the shared channel.

The control section 210 may determine the granularity of the reference point based on information whose notification is performed by at least one of the downlink control information or the higher layer signaling.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a wireless manner, or the like, for example) and using these apparatuses. The functional blocks may be implemented by combining software with the above-described single apparatus or the above-described plurality of apparatuses.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 18:
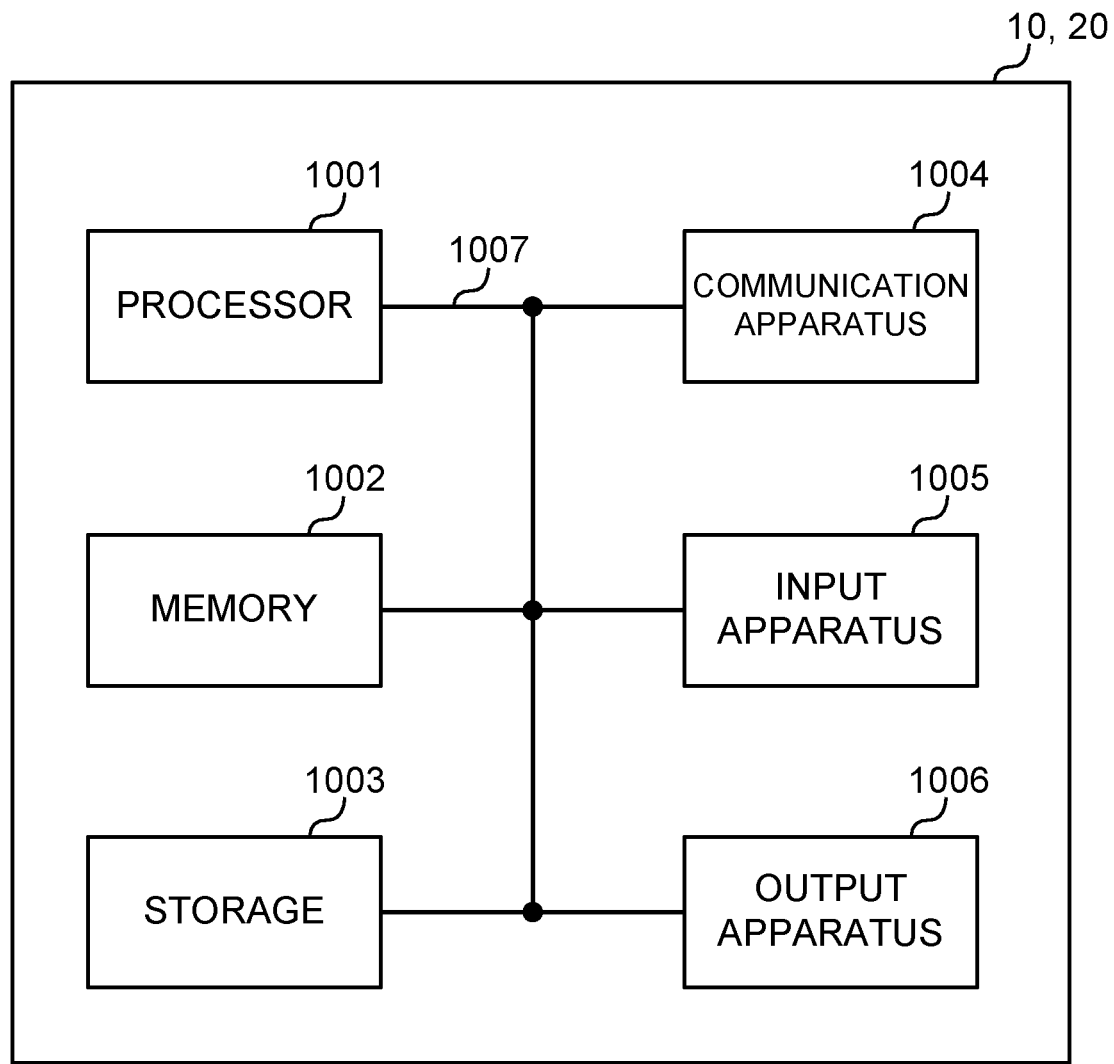
FIG. 18 is a diagram illustrating an example of a hardware configuration of the base station and the user terminal according to one embodiment.

For example, the base station, the user terminal, or the like according to one embodiment of the present disclosure may function as a computer that executes the processing of the radio communication method in the present disclosure. FIG. 18 is a diagram illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may include one or more of each of the apparatuses illustrated in the drawings, or does not have to include some apparatuses.

For example, although only one processor 1001 is illustrated, a plurality of processors may be provided. Further, the processing may be executed by one processor, or the processing may be executed by two or more processors in sequence or by using other methods. Note that the processor 1001 may be implemented by one or more chips.

Each of functions of the base station 10 and the user terminal 20 is implemented by causing given software (program) to be read on hardware such as the processor 1001 or the memory 1002 to thereby cause the processor 1001 to perform operation, control communication via the communication apparatus 1004, and control at least one of reading or writing of data from or in the memory 1002 and the storage 1003.

The processor 1001 may control the entire computer by operating, for example, an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program code), software modules, data, and so on from at least one of the storage 1003 or the communication apparatus 1004 into the memory 1002, and executes various processing according to these. As the program, a program that causes a computer to execute at least a part of the operation described in the above-described embodiment is used. For example, the control section 110 (210) may be implemented by a control program that is stored in the memory 1002 and that operates on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM) or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented in a physically or logically separated manner by the transmitting section 120*a* (220*a*) and the receiving section 120*b* (220*b*).

The input apparatus 1005 is an input device that receives input from the outside (for example, a keyboard, a mouse, a microphone, a switch, a button, a sensor, or the like). The output apparatus 1006 is an output device that performs output to the outside (for example, a display, a speaker, a light emitting diode (LED) lamp, or the like). Note that the input apparatus 1005 and the output apparatus 1006 may be integrated with each other (for example, a touch panel).

Further, these apparatuses such as the processor 1001 and the memory 1002 are connected to each other by the bus 1007 to communicate information. The bus 1007 may be configured by using a single bus, or may be configured by using a different bus for each apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented with the hardware. For example, the processor 1001 may be implemented with at least one of these pieces of hardware.
(Modification)

Note that terms described in the present disclosure and terms necessary for understanding the present disclosure may be replaced with terms that have the same or similar meanings. For example, a channel, a symbol, and a signal (signal or signaling) may be interchangeable. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more durations (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter applied to at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, and the like.

The slot may include one or more symbols in the time domain (orthogonal frequency division multiplexing (OFDM) symbols, single carrier frequency division multiple access (SC-FDMA) symbols, and the like). Also, the slot may be a time unit based on the numerology.

The slot may include a plurality of mini slots. Each mini slot may include one or more symbols in the time domain. Further, the mini slot may be referred to as a sub-slot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as "PDSCH (PUSCH) mapping type B".

The radio frame, the subframe, the slot, the mini slot, and the symbol all represent the time unit in signal communication. The radio frame, the subframe, the slot, the mini slot, and the symbol may be called by other applicable names, respectively. Note that time units such as the frame, the subframe, the slot, the mini slot, and the symbol in the present disclosure may be interchangeable.

For example, one subframe may be referred to as a TTI, a plurality of consecutive subframes may be referred to as a TTI, or one slot or one mini slot may be referred to as a TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot" and the like, instead of a "subframe".

Here, the TTI refers to the minimum time unit of scheduling in radio communication, for example. For example, in the LTE system, a base station performs scheduling to allocate radio resources (a frequency bandwidth and transmit power that can be used in each user terminal and the like) to each user terminal in TTI units. Note that the definition of the TTI is not limited thereto.

The TTI may be the transmission time unit of channel-encoded data packets (transport blocks), code blocks, codewords, or the like, or may be the unit of processing in scheduling, link adaptation, or the like. Note that when the TTI is given, a time interval (for example, the number of symbols) in which the transport block, the code block, the codeword, or the like is actually mapped may be shorter than the TTI.

Note that, when one slot or one mini slot is referred to as a "TTI", one or more TTIs (that is, one or more slots or one or more mini slots) may be the minimum time unit of scheduling. Also, the number of slots (the number of mini slots) to constitute this minimum time unit of scheduling may be controlled.

A TTI having a time duration of 1 ms may also be referred to as a usual TTI (TTI in 3GPP Rel. 8 to 12), a normal TTI, a long TTI, a usual subframe, a normal subframe, a long subframe, a slot, or the like. A TTI shorter than the usual TTI may be referred to as a shortened TTI, a short TTI, a partial TTI (or fractional TTI), a shortened subframe, a short subframe, a mini slot, a sub-slot, a slot, or the like.

Note that the long TTI (for example, the usual TTI, subframe, or the like) may be replaced with a TTI having a time duration exceeding 1 ms, and the short TTI (for example, the shortened TTI or the like) may be replaced with a TTI having a TTI length less than the TTI length of the long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on the numerology.

Also, the RB may include one or more symbols in the time domain, and may be one slot, one mini slot, one subframe, or one TTI in length. One TTI, one subframe, and the like each may include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a given signal/channel outside the active BWP. Note that "cell", "carrier", and the like in the present disclosure may be replaced with "BWP".

Note that structures of the radio frame, subframe, slot, mini slot, symbol, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Furthermore, information, a parameter, or the like described in the present disclosure may be represented in absolute values, represented in relative values with respect to given values, or represented by using another corresponding information. For example, a radio resource may be specified by a given index.

Names used for the parameters and the like in the present disclosure are not restrictive names in any respect. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals and the like can be output in at least one of a direction from higher layers to lower layers or a direction from lower layers to higher layers. Information, signals and the like may be input and output via a plurality of network nodes.

The information, signals and the like that are input and output may be stored in a specific location (for example, in a memory), or may be managed in a control table. The information, signals and the like to be input and output can be overwritten, updated or appended. The output information, signals, and the like may be deleted. The information, signals and the like that are input may be transmitted to other apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Further, notification of given information (for example, notification of "being X") is not limited to explicit notification but may be performed implicitly (for example, by not performing notification of the given information or by performing notification of another piece of information).

Judging may be made in values represented by one bit (0 or 1), may be made in Boolean values that represent true or false, or may be made by comparing numerical values (for example, comparison with a given value).

Regardless of whether or not being referred to as software, firmware, middleware, a microcode, or a hardware description language, or other names, software should be widely interpreted so as to mean an instruction, an instruction set, a code, a code segment, a program code, a program, a subprogram, a software module, an application, a software application, a software package, a routine, a subroutine, an object, an executable file, an execution thread, a procedure, a function, and the like.

Further, the software, instruction, information, and the like may be transmitted and received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station or a base station subsystem that performs a communication service in this coverage.

In the present disclosure, the terms such as mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmitting apparatus, a receiving apparatus, a radio communication apparatus, and the like. Note that at least one of the base station or the mobile station may be a device mounted on a moving body, a moving body itself, and the like. The moving body may be a transportation (for example, a car, an airplane, or the like), an unmanned moving body (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as judging, calculating, computing, processing, deriving, investigating, looking up, search, inquiry (for example, looking up in a table, database, or another data structure), ascertaining, and the like.

Furthermore, "determining" may be regarded as receiving (for example, receiving of information), transmitting (for example, transmitting of information), inputting, outputting, accessing (for example, accessing data in a memory), and the like.

Further, "determining" may be regarded as resolving, selecting, choosing, establishing, comparing, and the like. That is, "determining" may be regarded as a certain operation.

Furthermore, "determining" may be replaced with "assuming", "expecting", "considering", and the like.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered to be "connected" or "coupled" to each other by using one or more electrical wires, cables, printed electrical connections, and the like, and, as some non-limiting and non-inclusive examples, by using electromagnetic energy and the like having wavelengths in the radio frequency, microwave, and optical (both visible and invisible) domains.

In the present disclosure, the phrase "A and B are different" may mean "A and B are different from each other". Note that the phrase may mean that "A and B are different from C". Terms such as "leave", "coupled", or the like may also be interpreted in the same manner as "different".

In a case where terms such as "include", "including", or a variation of these are used in the present disclosure, these terms are intended to be inclusive similarly to a case where "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Thus, the description of the present disclosure is for the purpose of explaining examples and does not bring any limiting meaning to the invention according to the present disclosure.

The invention claimed is:

1. A terminal comprising:
   a receiver that receives downlink control information including a time domain resource allocation field; and
   a processor that determines, based on a value indicated by the time domain resource allocation field and a reference point determined based on given conditions, an allocation of a downlink shared channel scheduled by the downlink control information,
   wherein at least one of the given conditions is a format of the downlink control information.

2. The terminal according to claim 1, wherein the processor uses, as the reference point, a starting position in a monitoring region of a downlink control channel corresponding to the downlink control information.

3. The terminal according to claim 1, wherein at least one of the given conditions is a mapping type of the downlink shared channel.

4. The terminal according to claim 1, wherein at least one of the given conditions is information notified by higher layer signaling.

5. The terminal according to claim 1, wherein at least one of the given conditions is an RNTI used for CRC scrambling of the downlink control information.

6. A radio communication method for a terminal, comprising:
   receiving downlink control information including a time domain resource allocation field; and
   determining, based on a value indicated by the time domain resource allocation field and a reference point determined based on given conditions, an allocation of a downlink shared channel scheduled by the downlink control information,
   wherein at least one of the given conditions is a format of the downlink control information.

7. A base station comprising:
   a transmitter that transmits downlink control information including a time domain resource allocation field; and
   a processor that controls, based on a value indicated by the time domain resource allocation field and a reference point determined based on given conditions, an allocation of a downlink shared channel scheduled by the downlink control information,
   wherein at least one of the given conditions is a format of the downlink control information.

8. A system comprising a terminal and a base station, wherein
   the terminal comprises:
      a receiver that receives downlink control information including a time domain resource allocation field; and
      a processor of the terminal that determines, based on a value indicated by the time domain resource allocation field and a reference point determined based on given conditions, an allocation of a downlink shared channel scheduled by the downlink control information,
      wherein at least one of the given conditions is a format of the downlink control information, and
   the base station comprises:
      a transmitter that transmits the downlink control information; and
      a processor of the base station that controls the allocation of the downlink shared channel.

9. The terminal according to claim 2, wherein at least one of the given conditions is a mapping type of the downlink shared channel.

10. The terminal according to claim 2, wherein at least one of the given conditions is information notified by higher layer signaling.

11. The terminal according to claim 3, wherein at least one of the given conditions is information notified by higher layer signaling.

12. The terminal according to claim 2, wherein at least one of the given conditions is an RNTI used for CRC scrambling of the downlink control information.

13. The terminal according to claim 3, wherein at least one of the given conditions is an RNTI used for CRC scrambling of the downlink control information.

14. The terminal according to claim 4, wherein at least one of the given conditions is an RNTI used for CRC scrambling of the downlink control information.

* * * * *